United States Patent Office 3,157,909
Patented Nov. 24, 1964

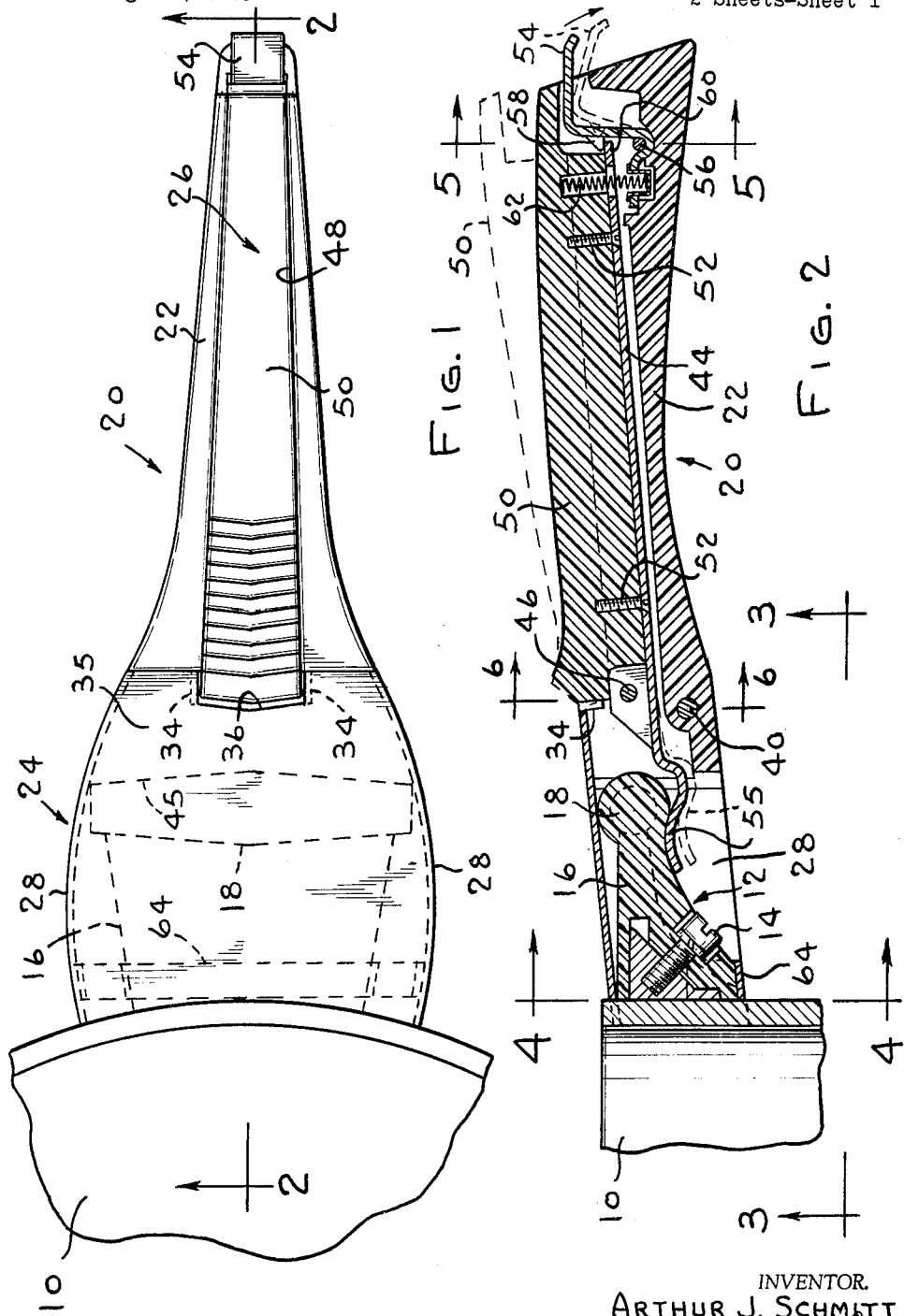

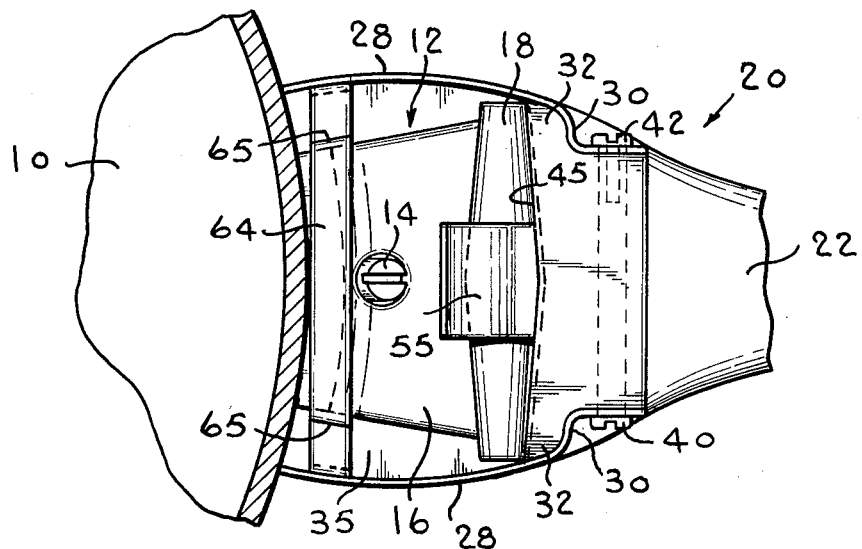
FIG. 3
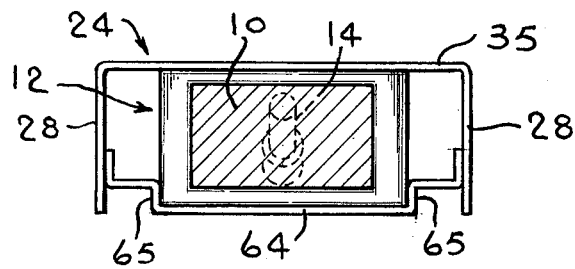
FIG. 4
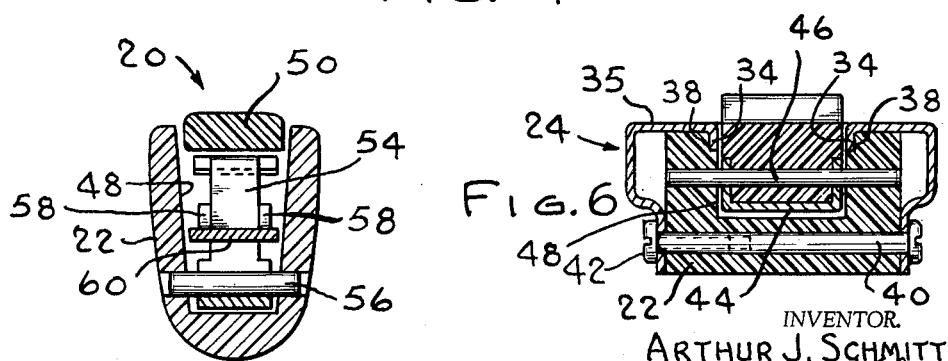
FIG. 5
FIG. 6
INVENTOR.
ARTHUR J. SCHMITT
BY John W. Michael
ATTORNEY

3,157,909
DETACHABLE HANDLE
Arthur J. Schmitt, West Bend, Wis., assignor to The West Bend Company, West Bend, Wis., a corporation of Wisconsin
Filed Aug. 31, 1961, Ser. No. 135,204
5 Claims. (Cl. 16—114)

This invention relates to an improved pan handle for detachable attachment to kitchen utensils.

The primary object of this invention is to provide a detachable pan handle that can be positively locked onto a pan so that the pan can be held in any position.

Another object of the present invention is to provide a detachable handle for kitchen utensils that is locked to the utensil upon operatively gripping the handle in lifting the pan.

These objects are accomplished by securing a hollow cap to the end of an elongate handle which is provided with internal surfaces for engaging a contoured lip on the utensil. A lever is pivoted in the elongate handle with one end of the lever projecting above the handle so that it is squeezed into the handle when the handle is gripped to lift the utensil. The other end of the lever extends into the hollow cap to operatively engage the contoured lip and press it against the cap. The lever is locked in position by a latch on the end of the elongate handle and is readily accessible to release the lever from the contoured lip.

Other objects and advantages will be pointed out in or be apparent from the specification and claims, as will obvious modifications of the single embodiment shown in the drawings, in which:

FIG. 1 is a top view of the detachable handle assembly mounted on the pan handle;

FIG. 2 is a view taken on line 2—2 of FIG. 1 showing the lever engaging the pan handle;

FIG. 3 is taken on line 3—3 of FIG. 2 showing the position of the pan handle in the cap of the detachable handle;

FIG. 4 is a view taken on line 4—4 of FIG. 2 showing the pan handle positively located in the cap of the detachable handle assembly;

FIG. 5 is taken on line 5—5 of FIG. 2 showing the relation of the latch to the lever; and FIG. 6 is a view taken on line 6—6 of FIG. 2 showing the cap mounted on the handle.

Referring to the drawings, a section of a kitchen utensil such as a pan or dish 10 is shown having a fixed lip 12 secured to the pan by a screw 14. The fixed lip has a body portion 16 that diverges outward from the pan to an enlarged lip 18. This lip is adapted to receive a detachable handle assembly 20 which includes a hand grip portion 22, a cap 24 and a lever 26 pivoted on the hand grip portion.

The cap has arcuate sides 28 that form an extension of the sides of the hand grip portion and is positioned on the hand grip portion with inwardly curved shoulders 30 slidingly engaging a pair of projections 32 on the hand grip portion. A pair of tabs 34 are bent downward at right angles to the top 35 of the cap from the sides of a notch 36 and fit into slots 38 in the hand grip portion. A post 40 and screw 42 secure the cap to the hand grip portion. A bar 64 is secured to the inside surfaces of the sides of the cap to engage the undersurface of the lip and is bent at 65 to provide a guide surface for centering the lip in the cap.

The lever includes a flat metal section 44 pivoted on pin 46 in groove 48 of the hand grip portion and has a plastic section 50 mounted on the flat metal section by screws 52. End 55 of the metal strip is bent to conform to the contour of the surface under the lip and upon squeezing of the lever into the hand grip portion the end 55 forces the lip against the undersurface of the top of the cap and against surface 45 on the end of the hand grip portion. A latch 54 is pivoted on pin 56 in the groove of the hand grip portion and has tabs 58 that catch end 60 of the flat section when the lever is squeezed into the hand grip portion. A spring 62 biases the latch into engagement with the end of the strip and also biases the lever to an open position when the lever is released from the latch.

The detachable handle assembly is mounted on the pan handle by inserting the lip into the open end of the cap above the brackets 64 until the lip engages the front surface 45 of the hand grip portion. The undersurface of the top of the cap will rest on the upper surface of the lip. The bar engages the undersurface of the fixed lip and centers the lip in the cap.

When the handle is gripped to lift the pan, the lever will be squeezed into the groove of the hand grip portion against the bias of the spring until tabs 58 snap over the end of the lever locking the lever in the groove. End 55 of the strip will engage the undersurface of the lip holding the fixed handle against the cap as well as against the hand grip portion. It should be noted that the cap cooperates with the fixed lip to provide sufficient holding surface to support the pan alone so there will be little or no force on the lever. With the handle positively located in the cap by the bar and forward portion of the hand grip portion, locking of the lever makes it possible to lift and hold the pan in any position.

Although but one embodiment of the present invention has been illustrated and described, it will be apparent to those skilled in the art that various changes and modifications may be made therein without departing from the spirit of the invention or from the scope of the appended claims.

I claim:
1. A detachable handle for use with a utensil having a laterally extending fixed lip, said detachable handle comprising, in combination,
    an elongated hand grip portion having a longitudinally extending groove therein,
    a cap portion connected to one end of and forming an extension of said hand grip portion and including a clamping surface arranged for engagement with said fixed lip,
    a lever pivotally supported in and extending exteriorly of said groove to be engaged when said hand grip portion is gripped and pivoted in said groove in response to gripping action on said hand grip portion, a portion of said lever extending into said cap portion and arranged for movement toward said clamping surface in response to pivotal movement of said lever as a result of said gripping action so that said lip is selectively clamped between said lever portion and said clamping surface to attach said detachable handle to said utensil,
    means biasing said lever about its pivotal axis in a direction such that said lever portion is biased away from engagement with said clamping surface,
    and latch means arranged in said hand grip portion for engagement with said lever when said lever portion is moved toward said clamping surface to engage said fixed lip and operative to lock said lever with said lever portion in engagement with said fixed lip.

2. A detachable handle for use with a utensil having a laterally extending fixed lip including oppositely facing surfaces, said detachable handle comprising, in combination, an elongated hand grip portion having a longitudinally extending groove therein, a cap portion attached to and extending from an end of said hand grip portion, said cap portion including first and second relatively spaced surfaces spaced from said end of said hand grip portion and defining an opening through which said lip is receivable into said cap portion, said first and second surfaces arranged to engage said oppositely facing surfaces of said lip to support said utensil from said detachable handle solely, a lever mounted in said groove for pivotal movement about an axis extending transversely of the longitudinal axis of said hand grip portion and extending exteriorly of said groove to be engaged when said hand grip portion is gripped and pivoted in said groove in response to gripping action on said hand grip portion, said lever including a portion extending into said cap portion and movable toward one of said first and second surfaces in response to said gripping action so that said lip is selectively clamped between said lever portion and said one surface to attach said detachable handle to said utensil, means biasing said lever about its pivotal axis in a direction such that said lever portion is biased away from engagement with said one surface, and latch means arranged in said hand grip portion for engagement with said lever when said lever portion is moved toward said surface to engage said fixed lip and operative to lock said lever with said lever portion in engagement with said fixed lip.

3. A detachable handle arrangement for a utensil comprising, in combination, a fixed lip extending laterally of said utensil and including an upper surface, a lower surface and an arcuate surface in said lower surface spaced inwardly of the end of said lip, an elongated hand grip portion having a longitudinally extending open groove therein, a cap portion connected to and extending from an end of said hand grip portion, said cap portion including an upper surface and an open end for receipt of said lip into said cap portion, said lip abutting said end of said hand grip portion when said lip is positioned in said cap portion, a lever mounted in said groove for pivotal movement about an axis extending transversely of the longitudinal axis of said hand grip portion and extending exteriorly of said groove to be engaged when said hand grip portion is gripped and pivoted in said groove in response to gripping action on said hand grip portion, said lever including a portion extending into said cap portion beyond the end of said hand grip portion and including an arcuate portion arranged to engage the arcuate surface of said lip, said lever portion movable toward the arcuate surface of said lip in response to said gripping action, whereby said lip is selectively clamped between said lever portion and said upper cap portion and the engagement between said lever portion and the arcuate surface of said lip urges said lip and the end of said hand grip portion into engagement, means biasing said lever about its pivotal axis in a direction such that said lever portion is biased away from engagement with said arcuate surface and so that the pivot force exerted when the hand grip is gripped acts against said biasing means, and latch means arranged in said hand grip portion for engagement with said lever when said lever portion is moved toward said arcuate surface to engage said fixed lip and operative to lock said lever with said lever portion in engagement with said fixed lip.

4. The combination of claim 3 wherein said latch means comprises a pivotally mounted latch member extending into said groove, said latch member biased toward engagement with said lever and including a portion extending exteriorly of the free end of said hand grip portion to be readily accessible for releasing said lever portion from engagement with said lip and correspondingly releasing said detachable handle from said utensil.

5. A detachable handle for use with a utensil having a laterally extending fixed lip, said detachable handle comprising, in combination, an elongated hand grip portion having a longitudinally extending groove therein, a lip engaging portion connected to one end of and forming an extension of said hand grip portion and including a clamping surface arranged for engagement with said fixed lip, a lever pivotally supported in and extending exteriorly of said groove to be engaged when said hand grip portion is gripped and pivoted in said groove in response to gripping action on said hand grip portion, a portion of said lever extending therefrom into opposed relation with the clamping surface of said lip engaging portion and arranged for movement toward said clamping surface in response to pivotal movement of said lever as a result of said gripping action so that said lip is selectively clamped between said lever portion and said clamping surface to attach said detachable handle to said utensil, and latch means arranged in said hand grip portion for engagement with said lever when said lever portion is moved toward said clamping surface to engage said fixed lip and operative to lock said lever with said lever portion in engagement with said fixed lip.

References Cited by the Examiner

UNITED STATES PATENTS

| | | | |
|---|---|---|---|
| 1,364,552 | 1/21 | Hill | 16—114 |
| 1,595,469 | 8/26 | Irving | 294—31 |
| 1,840,775 | 1/32 | Hardy | 294—31 |
| 2,478,784 | 8/49 | Serio | 294—31 |
| 2,851,299 | 9/58 | Serio | 16—114 |
| 3,065,018 | 11/62 | Serio | 16—114 X |

DONLEY J. STOCKING, *Primary Examiner.*